United States Patent
Beukema et al.

(10) Patent No.: US 6,748,499 B2
(45) Date of Patent: Jun. 8, 2004

(54) SHARING MEMORY TABLES BETWEEN HOST CHANNEL ADAPTERS

(75) Inventors: Bruce Leroy Beukema, Hayfield, MN (US); David F. Craddock, New Paltz, NY (US); Thomas Anthony Gregg, Highland, NY (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 09/998,403

(22) Filed: Nov. 15, 2001

(65) Prior Publication Data

US 2003/0093625 A1 May 15, 2003

(51) Int. Cl.⁷ .............................................. G06F 12/14
(52) U.S. Cl. ...................... 711/147; 711/152; 711/163
(58) Field of Search ................................ 711/147, 152, 711/163

(56) References Cited

U.S. PATENT DOCUMENTS

| | | | | |
|---|---|---|---|---|
| 2002/0091841 A1 | * | 7/2002 | Beukema et al. | 709/229 |
| 2002/0124148 A1 | * | 9/2002 | Beukema et al. | 711/163 |
| 2003/0051103 A1 | * | 3/2003 | Lardner et al. | 711/147 |

* cited by examiner

*Primary Examiner*—Hiep T. Nguyen
(74) *Attorney, Agent, or Firm*—Duke W. Yee; Casimer K. Salys; Michael R. Nichols

(57) ABSTRACT

A method, computer program product, and data processing system for sharing memory protection tables and address translation tables among multiple Host Channel Adapters are disclosed. The protection and address translation tables for a shared memory region are written in memory of the host. The Host Channel Adapters are registered with the memory region so that each adapter stores an address pointer to the tables. In this way, the tables need not be duplicated for each adapter.

39 Claims, 6 Drawing Sheets

SHARING MEMORY TABLES BETWEEN HOST CHANNEL ADAPTERS

BACKGROUND OF THE INVENTION

1. Technical Field

The present invention relates to memory access in computer systems, and more specifically, how to efficiently provide shared access from multiple host channel adapters (HCA) to particular areas of memory.

2. Description of Related Art

In a System Area Network (SAN), the hardware provides a message passing mechanism which can be used for Input/Output devices (I/O) and interprocess communications between general computing nodes (IPC). Consumers access SAN message passing hardware by posting send/receive messages to send/receive work queues on a SAN channel adapter (CA). The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

A Memory Region is an area of memory that is contiguous in the virtual address space and for which the translated physical addresses and access rights have been registered with the HCA. Memory Registration is used to pin a Memory Region and make it accessible by the HCA. The HCA's software is provided with the Memory Region's protection domain (used to associate the memory region to a QP), access rights (local write, remote write, remote read), length, and virtual address. The HCA software translates the virtual address and length to the set of physical pages mapped to the virtual region. The HCA software then makes all of this information available to the HCA. This process requires considerable overhead, including kernel intervention, in order to set up the access rights, pinning or unpinning of memory, and setting up the address translation tables.

Unfortunately memory protection and address translation tables cannot be shared between CAs. Hence, nodes which support mulitple CAs will often have needlessly redundant entries in the memory protection and address translation tables, thus wasting valuable memory resources. Therefore, it would be desirable to provide a mechanism to allow sharing of these memory tables between channel adapters.

SUMMARY OF THE INVENTION

The present invention provides a method, computer program product, and data processing system for sharing memory protection tables and address translation tables among multiple Host Channel Adapters.

This invention utilizes a "Register Shared Memory Region" verb (command). When a particular memory region is to be shared among multiple HCAs, the consumer issues a "Register Shared Memory Region" verb to HCA software specifying the HCA, virtual address, length, protection domain, and access control parameters for each instance of this verb. The consumer further identifies the particular Memory Region that is to be shared. The HCA software returns to the consumer an "R_Key" value that must be associated with all queue pairs of each HCA that will access this shared memory region. The HCA software also keeps track of the HCAs that have been given access to the shared Memory Region so that it can determine when it is safe to deregister the Memory Region. Additionally, in response to the "Register Shared Memory Region" verb, the HCA software creates and manages an "HCA Access List" for each shared Memory Region. The HCA Access List identifies the HCAs that are granted access to the particular shared Memory Region.

The invention also employs a set of hardware registers within the HCA that point to the location of the memory protection and address translation tables in system memory. When the HCA software registers a memory region, it loads these hardware registers with the system memory location of the protection and address translation tables. Each HCA includes a hardware register containing the HCA's "HCA Identifier (HCA ID)." HCA software loads a unique value into this register prior to the HCA accessing any portion of either a shared or non-shared Memory Region.

When the HCA accesses a virtual address, via an RDMA (remote direct memory access) operation for instance, the HCA fetches the protection and address translation data from the tables located in system memory. The HCA checks the values of the protection domain for the memory region to ensure it matches the protection domain value of the queue pair so that it may access the memory region in question. The HCA further checks the HCA Access List for an instance of its HCA ID to determine whether this particular HCA has been granted access to this shared Memory Region.

Since the protection tables and address translation tables are located within the system memory of the host and thus are accessible by all HCAs attached to that host, sharing of the memory region can be accomplished without duplication of the protection and address translation tables.

When the consumer requests that a memory region be de-registered (via the "Deregister Memory Region" verb), it supplies the HCA software with the particular memory region that is being de-registered as well as the HCA from which it is being deregistered. The HCA software will invalidate the hardware registers that contain the system memory location of the protection and address translation tables associated with the shared memory region. The HCA software will further note that this particular HCA is no longer registered with the shared Memory Region, and will remove the HCA ID of this particular HCA from the HCA Access List associated with this Memory Region. The HCA software will not modify the system memory locations that contain the protection tables and address translation tables unless it determines that there are no HCAs currently using these facilities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a distributed computing system having end nodes, switches, routers, and links interconnecting these components. Each end node uses send and receive queue pairs to transmit and receive messages. The end nodes segment the message into packets and transmit the packets over the links. The switches and routers interconnect the end nodes and route the packets to the appropriate end node. The end nodes reassemble the packets into a message at the destination.

Figure 1:
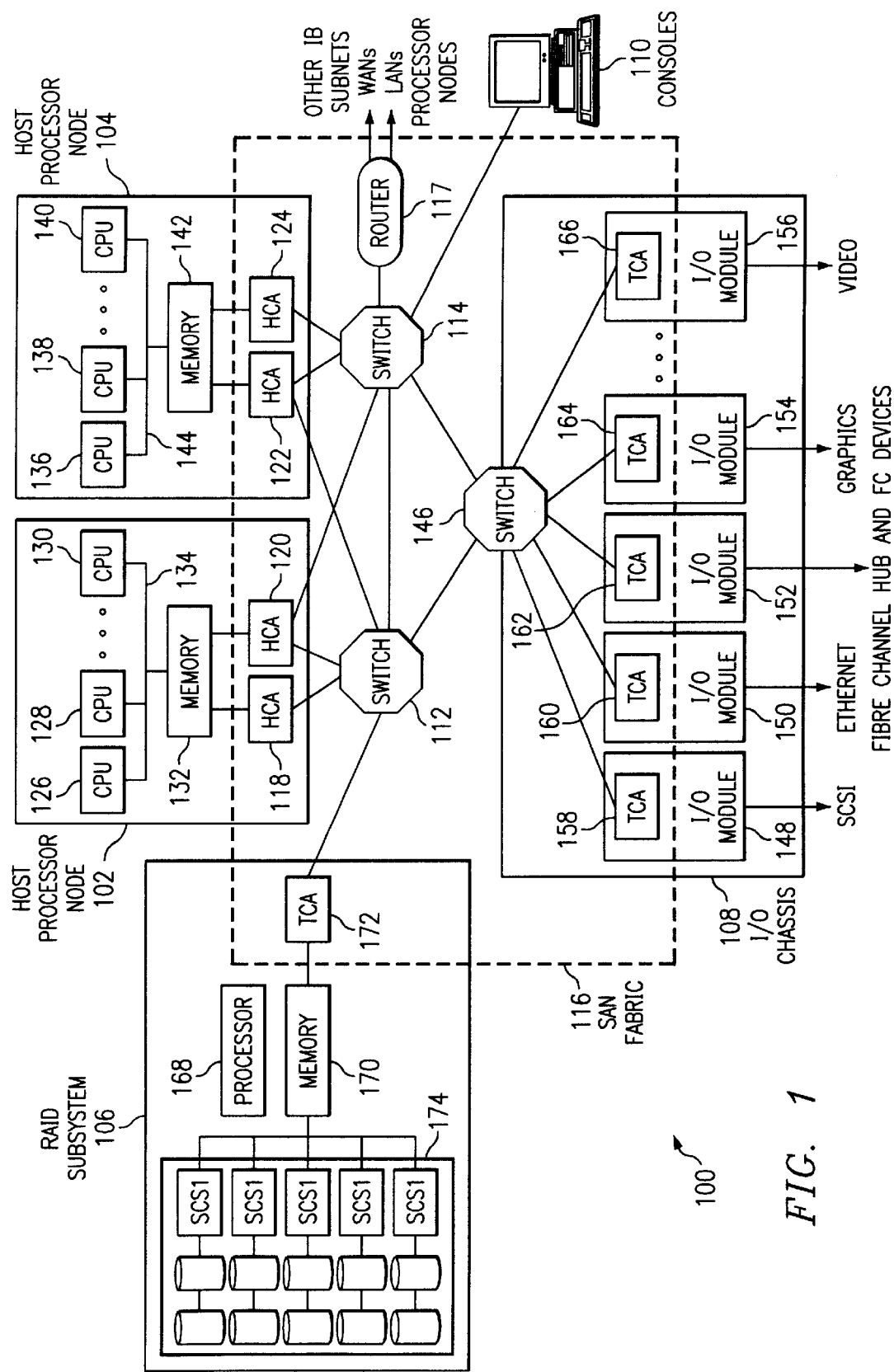
FIG. 1 is a diagram of a distributed computer system is illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet. SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or packets in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the packet through SAN 100. The trailer generally contains control and cyclic redundancy check (CRC) data for ensuring packets are not delivered with corrupted contents. SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed. In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144. Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in a distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory. Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
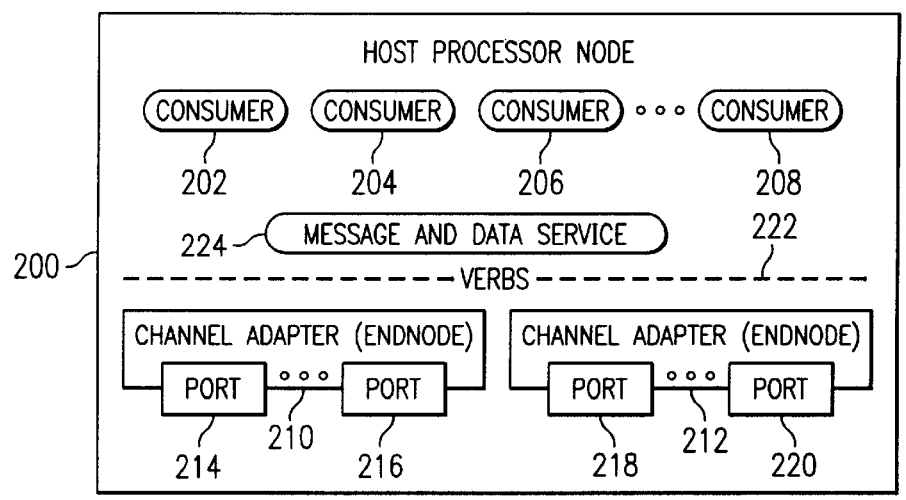
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

Figure 3:
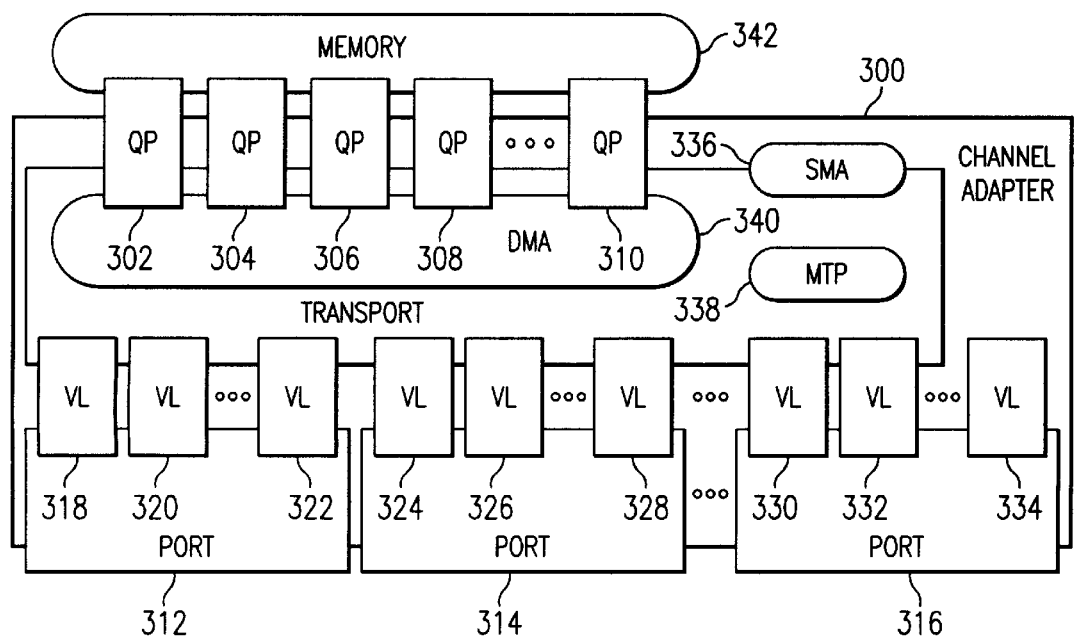
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID.

Subnet manager agent (SMA) 336 is the entity that communicates with the subnet manager for the purpose of configuring the channel adapter. Memory translation and protection (MTP) 338 is a mechanism that translates virtual addresses to physical addresses and validates access rights. Direct memory access (DMA) 340 provides for direct memory access operations using memory 342 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Memory registration is a process by which a virtually contiguous region of memory is prepared for the use of a consumer. The consumer specifies the characteristics of the desired memory region via the "Register Memory Region" verb, which includes a designation of the desired HCA, a virtual address for the memory region, a length of the memory region, a protection domain for the memory region (used to grant or deny access privileges to HCAs attempting to access the memory region), and miscellaneous other access control attributes (such as "read only," "write only," or "read/write," for instance).

HCA software (e.g., firmware) associated with the HCA performs the operations needed to prepare the requested memory region for usage by the HCA, and returns to the consumer a memory region identifier, a local key ($L_{13}$ key), and a remote key (R_key). The L_key and R_key are used to validate accesses to the particular memory region. The L_key is supplied by a consumer to validate its access to the memory region, while the R_key is used by a remote device (such as a storage device or other peripheral on the SAN).

The present invention is directed toward registering memory regions as shared memory regions shared among multiple HCAs. According to a preferred embodiment of the present invention, a memory region is first registered with respect to a first HCA, then registered as a shared memory region with respect to one or more additional HCAs.

It is important to note that the term "HCA software" refers to firmware that is associated with an HCA. In a preferred embodiment, HCA software is executed by a host processor residing on the host computer.

Figure 4:
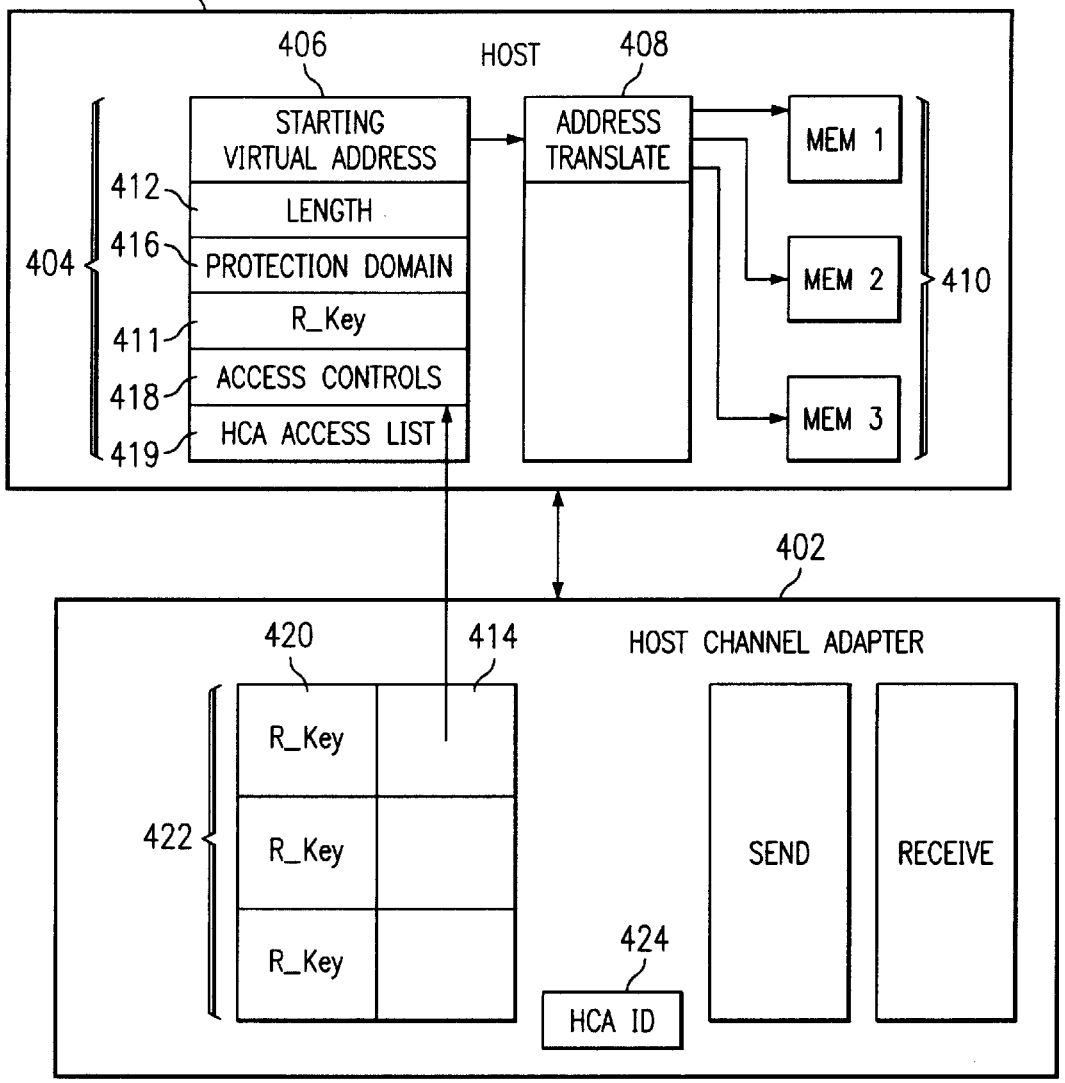
FIG. 4 is a diagram depicting a process of registering a host channel adapter with a memory region in accordance with a preferred embodiment of the present invention.

FIG. 4 is a diagram depicting a process of registering an HCA with a memory region in a host, in accordance with a preferred embodiment of the present invention. The diagram depicts the memory space of a host 400 and the memory space of an attached HCA 402. To establish a memory region, a consumer residing on host 400 issues a "Register Memory Region" verb to HCA software associated with HCA 402. The HCA software, in response, creates protection table 404 within the memory of host 400.

Protection table 404 contains information necessary for a host channel adapter to access the contents of the memory region. Protection table 404 includes a starting virtual address 406 for the memory region, which maps into an address translation table 408. Protection table 404 also includes a length 412, a protection domain 416, a location for an R_key 411, miscellaneous access controls 418, and an HCA Access List 419. Protection domain 416 is a designation of particular consumers that may access the memory region. Address translation table 408 maps virtual addresses within the memory region (which has a continuous range of virtual addresses) to physical locations from memory blocks 410, each of which may reside anywhere within the memory of host 400. R_key 411 provides an extra level of memory protection, as will be seen. HCA Access List 419 contains the list of HCA IDs that are to be granted access to the shared Memory Region.

HCA software completes the registration process by loading a hardware register 414 with the physical address of protection table 404. Hardware register 414 is preferably contained within a table 422 mapping R_Keys to protection table addresses.

HCA software then generates an R_key 420 corresponding to hardware register 414, and returns R_key 420 to the host to be stored in R_key storage 411. The host will provide the R_key in R_key storage 411 to any additional HCAs registered to the memory region.

When a remote device associated with HCA 400 sends a request to HCA 400 to access the memory region, HCA hardware locates memory access data 404 by looking up the address in hardware register 414, using a portion of R_Key 420 as a search key to locate hardware register 414. HCA hardware then verifies that it is allowed to access the memory by comparing R_key 420 with the R_key in R_key storage 411. If the two keys match, HCA hardware examines protection domain 416 to verify that protection domain 416 matches the protection domain of the HCA's queue pair and thus the consumer associated with this queue pair may access the memory region. Finally, the HCA checks the HCA Access List for an instance of the value contained in its HCA ID register to determine whether it is allowed access to the Memory Region. If a match exists for the aforementioned checks, HCA hardware uses address translation table 408 to translate the virtual memory address desired into a physical memory address within memory blocks 410. The host channel adapter can then access the desired memory location using the physical address.

Figure 5:
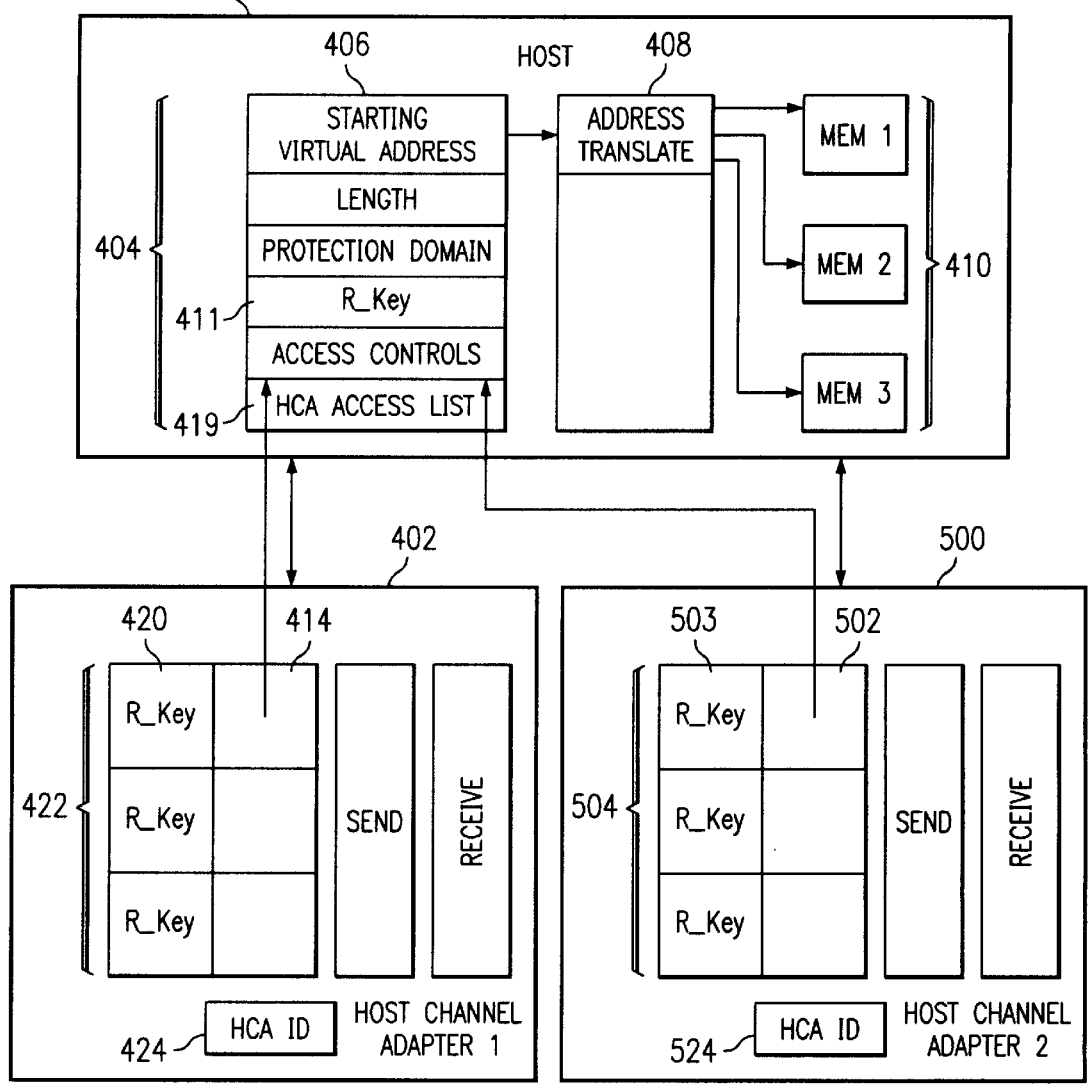
FIG. 5 is a diagram depicting a process of registering an additional host channel adapter with a shared memory region in accordance with a preferred embodiment of the present invention.

FIG. 5 is a diagram depicting how multiple host channel adapters may be registered to a single shared memory region in accordance with a preferred embodiment of the present invention. A consumer residing on host 400 issues a "Register Shared Memory Region" verb to software associated with HCA 500. The "Register Shared Memory Region" verb contains a designation of HCA 500 as the HCA to be registered with the memory region, a memory region identifier identifying the particular memory region to be registered with, the virtual address of the memory region, the protection domain value that is identical to the value originally assigned to this region, and miscellaneous access control selections. HCA software updates HCA Access List 419 to include the value of HCA ID 524, which is contained within HCA 500.

Hardware register 502 in HCA 500 is set to point to protection table 404, with associated R_key 503 set to match R_key storage 411. Thus, HCA 402 and HCA 500 are made to share the memory region represented by protection table 404. The HCA software associated with HCA 500 will return an memory region identifier, R_key, and L_key associated with the memory region. In a preferred embodiment, the HCA software will also maintain status information regarding which HCAs are registered with the shared Memory Region. Alternatively, the HCA software could maintain a count of HCAs that are associated with the shared Memory Region.

Figure 6:
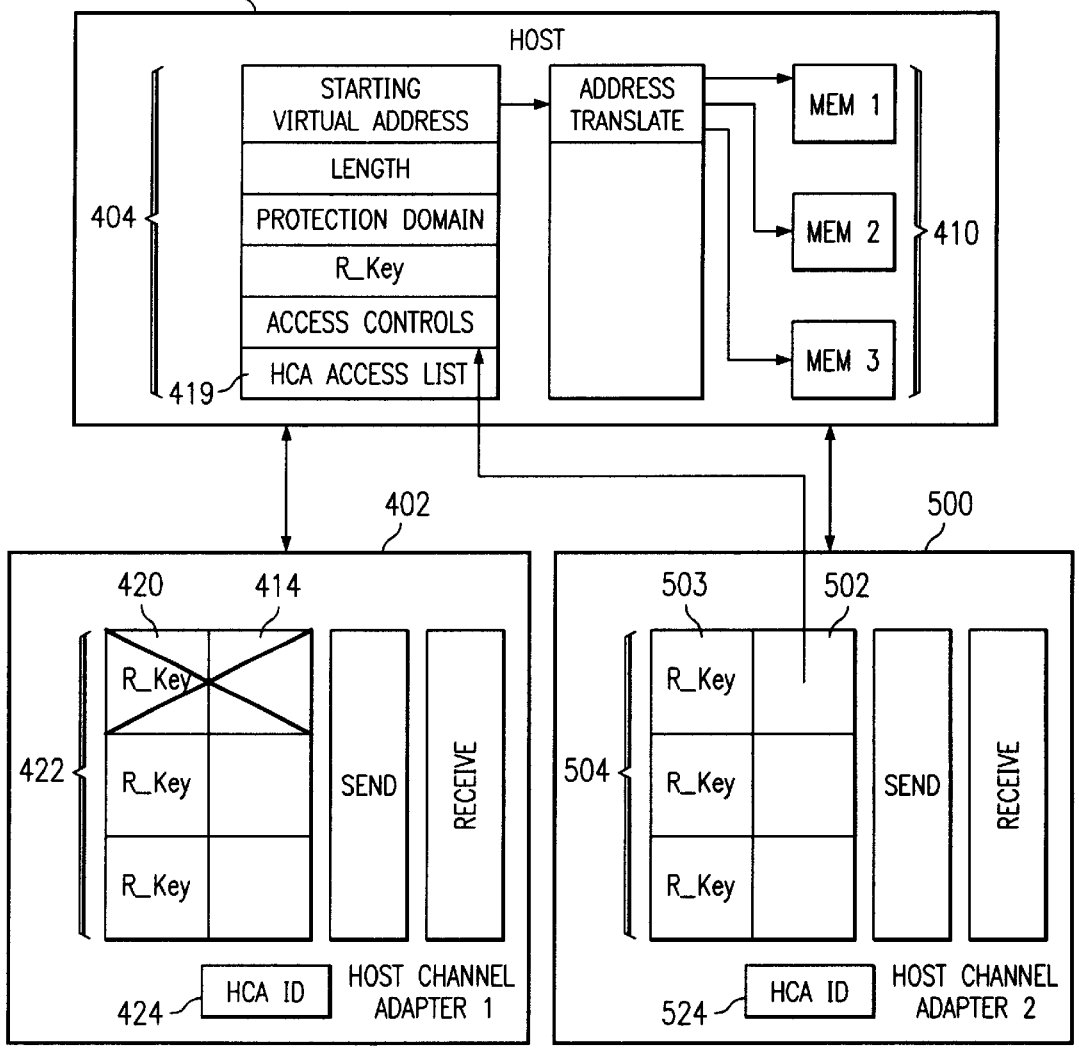
FIG. 6 is a diagram depicting a process of de-registering a host channel adapter from a shared memory region in accordance with a preferred embodiment of the present invention.

HCAs may also be de-registered from a memory region. When two or more HCAs share a memory region, the de-registration process does not modify information stored in the protection table, but merely invalidates the hardware register pointing to that table in the HCA to be de-registered. HCA software also updates status information regarding those HCAs that still retain access to the shared Memory Region, and removes from the HCA Access List the HCA ID of the HCA that is being deregistered. FIG. 6 is a diagram depicting a process of de-registering a host channel adapter from a memory region in accordance with a preferred embodiment of the present invention. Host 400 issues a "De-Register Memory Region" verb to HCA software associated with HCA 402, which is to be de-registered. HCA software then invalidates R_key 420 and hardware register 414. Because the memory region is still registered to HCA 500, however, HCA Software does not change or destroy protection table 404 during this process, but it does remove HCA ID 419 from the HCA Access List. If protection table 404 (and thus the memory region) were not shared, however, protection table 404 would be destroyed and de-allocated to free the memory taken up by protection table 404 for other uses.

Figure 7:
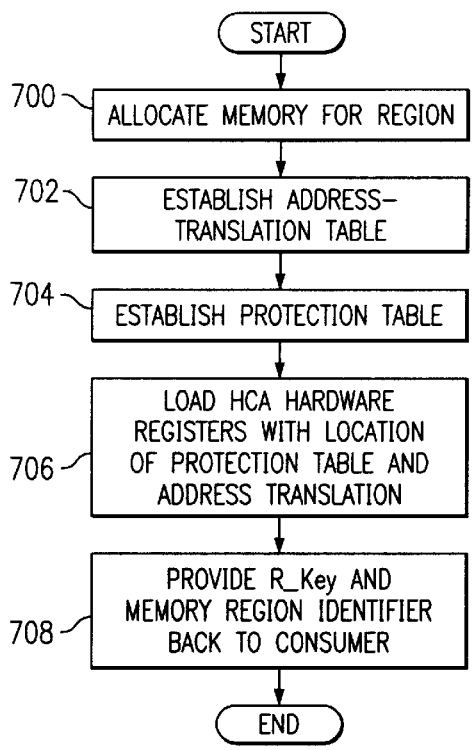
FIG. 7 is a flowchart representation of registering a host channel adapter with a memory region in accordance with a preferred embodiment of the present invention.

FIG. 7 is a flowchart representation of a process of initially registering an HCA to a memory region under the direction of a consumer, in accordance with a preferred embodiment of the present invention. First, memory for the memory region is allocated out of (possibly non-contiguous) available memory blocks (step 700). Next, a translation table mapping a range of continuous virtual addresses to the allocated physical memory locations is established in host memory (step 702). A protection table for those host channel adapters that may access the memory region is generated in host memory (step 704). HCA hardware registers are loaded with the location of the protection table (and by implication, the address translation table) (step 706). Finally, an R_key and a memory region identifier are returned to the consumer (step 708).

Figure 8:
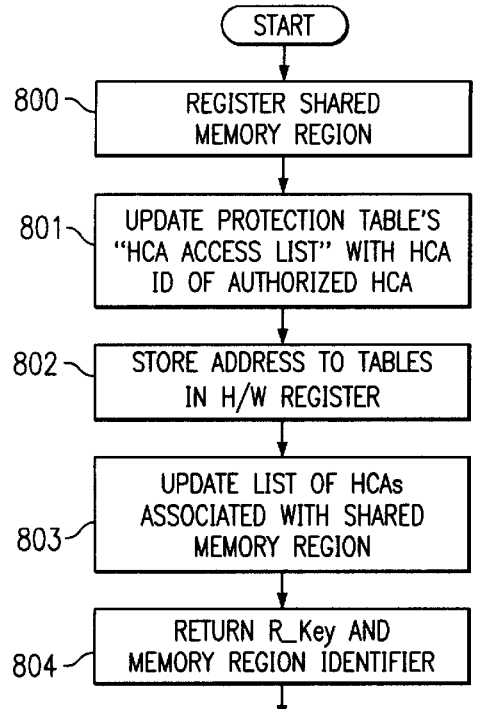
FIG. 8 is a flowchart representation of a process of registering an additional host channel adapter with a shared memory region in accordance with a preferred embodiment of the present invention.

FIG. 8 is a flowchart representation of a process of registering an HCA with a shared memory region in accordance with a preferred embodiment of the present invention. A "Register Shared Memory Region" verb is received from a consumer (step 800). This verb contains a memory region identifier (memory access data) that maps into the address of protection and address translation tables associated with the shared memory region, and an identifier of the HCA for whom access to the shared memory region is being granted. The HCA Access List of the protection table is updated with the value of the HCA ID of the HCA specified in the "Register Shared Memory Region" verb (step 801). The address of the protection and address translation tables is stored in a hardware register of the host channel adapter (step 802). The HCA software updates the list of HCAs that are associated with the shared Memory Region (step 803). Finally, the R_key associated with the memory region is returned to the consumer along with the memory region identifier (and L_key) (step 804).

Figure 9:
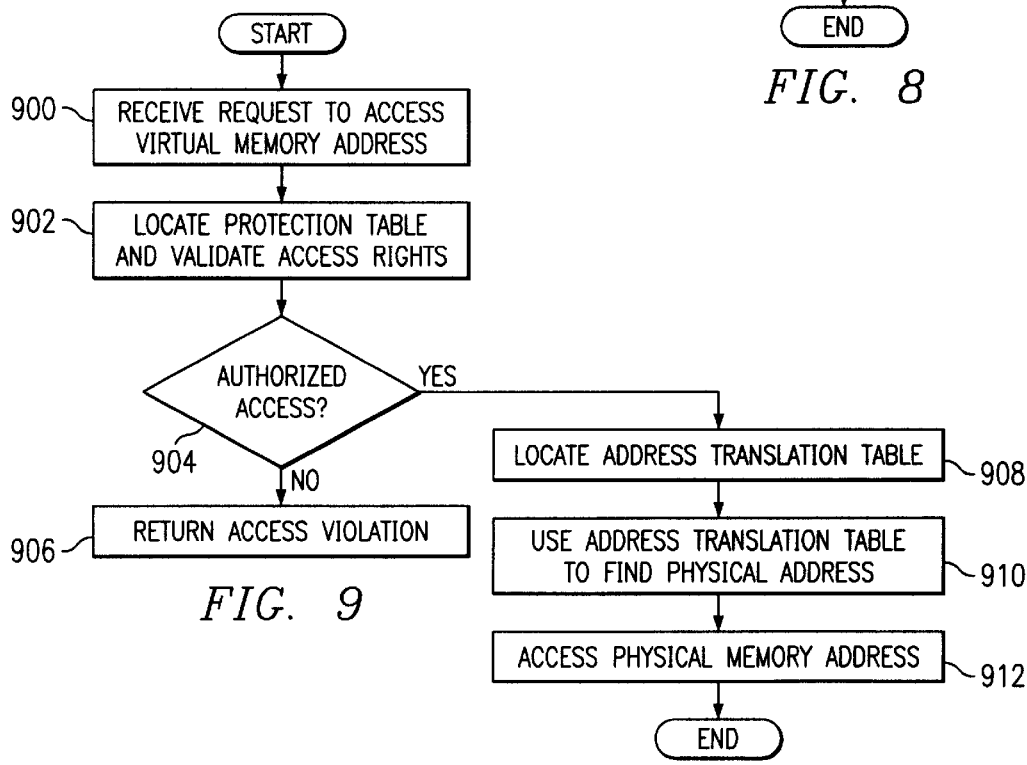
FIG. 9 is a flowchart representation of a process of a host channel adapter accessing a shared memory region in accordance with a preferred embodiment of the present invention.

FIG. 9 is a flowchart representation of an HCA accessing a virtual memory address within a shared memory region in accordance with a preferred embodiment of the present invention. The HCA first receives (from a remote device or through a local access) a request to access (read or write) a virtual memory address (step 900). Next, the HCA uses an address stored within a hardware register to locate the protection table for the memory region and validate access rights (step 902). If access is not authorized (step 904:No), an access violation is returned to the device that requested the memory access (step 906). If access is authorized, however (step 904:Yes), the address translation table associated with the protection table is located (step 908). Then, the HCA uses the address translation table to map the virtual address into a physical address (step 910). Finally, the host channel adapter accesses the physical memory address (step 912).

It is important to note that while the present invention has been described in the context of a fully functioning data processing system, those of ordinary skill in the art will appreciate that the processes of the present invention are capable of being distributed in the form of a computer readable medium of instructions or other functional descriptive material that enables a computer or other data processing system to execute such processes. One of ordinary skill in the art will also appreciate that the teachings of the present invention are applicable regardless of the particular type of signal bearing media actually used to carry out the distribution. Examples of computer readable media include recordable-type media, such as a floppy disk, a hard disk drive, a RAM, a ROM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   receiving, from a consumer, an instruction to register a shared memory region in memory of a host, wherein the instruction includes an identification of memory access data associated with the shared memory region; and
   in response to receiving the instruction, writing an address of the memory access data to a table in memory associated with a host channel adapter.

2. The method of claim 1, further comprising:
   updating status information denoting which host channel adapters are associated with the shared memory region.

3. The method of claim 2, wherein the updating step includes adding to an access list an identifier identifying the host channel adapter.

4. The method of claim 1, wherein the table includes a hardware register.

5. The method of claim 1, wherein the instruction includes at least one of a virtual address for the memory region, a length of the memory region, a protection domain of the memory region, an identifier identifying the host channel adapter, and access control parameters of the memory region.

6. The method of claim 1, further comprising:

receiving an instruction to deregister the host channel adapter from the shared memory region; and invalidating contents of the memory unit.

7. The method of claim 6, further comprising:

removing from an access list an instance of an identifier identifying the host channel adapter.

8. The method of claim 6, further comprising:

determining if additional host channel adapters are registered to the shared memory region; and modifying the memory access data in response to a determination that no additional host channel adapters are registered to the shared memory region.

9. The method of claim 1, further comprising:

reading from the memory access data a first protection domain associated with the shared memory region;

comparing the first protection domain a second protection domain associated with the host channel adapter to determine if the first protection domain and the second protection domain match; and accessing a portion of the shared memory region in response to a determination that the first protection domain and the second protection domain match.

10. The method of claim 9, further comprising:

reading from the memory access data an access list associated with the shared memory region; and searching the access list for an instance of an identifier identifying the host channel adapter.

11. The method of claim 10, wherein the accessing step is executed in response to a determination that the first protection domain and the second protection domain match and that the instance of the identifier identifying the host channel adapter is contained within the access list.

12. The method of claim 1, further comprising:

reading from the memory access data a physical memory address corresponding to a virtual memory address; and accessing a portion of the shared memory region corresponding to the physical memory address.

13. The method of claim 1, further comprising:

returning a key associated with the shared memory region to the host.

14. A computer program product in a computer readable medium, comprising functional descriptive material that when processed by a computer, enables the computer to perform acts including:

receiving, from a consumer, an instruction to register a shared memory region in memory of a host, wherein the instruction includes an identification of memory access data associated with the shared memory region; and in response to receiving the instruction, writing an address of the memory access data to a table in memory associated with a host channel adapter.

15. The computer program product of claim 14, comprising additional functional descriptive material that when processed by a computer, enables the computer to perform acts including:

updating status information denoting which host channel adapters are associated with the shared memory region.

16. The computer program product of claim 15, wherein the updating the status information includes adding to an access list an identifier identifying the host channel adapter.

17. The computer program product of claim 14, wherein the table includes a hardware register.

18. The computer program product of claim 14, wherein the instruction includes at least one of a virtual address for the memory region, a length of the memory region, a protection domain of the memory region, an identifier identifying the host channel adapter, and access control parameters of the memory region.

19. The computer program product of claim 14, wherein the functional descriptive material enables the computer to perform additional acts including:

receiving an instruction to deregister the host channel adapter from the shared memory region; and invalidating contents of the memory unit.

20. The computer program product of claim 19, wherein the functional descriptive material enables the computer to perform additional acts including:

removing from an access list an instance of an identifier identifying the host channel adapter.

21. The computer program product of claim 19, wherein the functional descriptive material enables the computer to perform additional acts including:

determining if additional host channel adapters are registered to the shared memory region; and modifying the memory access data in response to a determination that no additional host channel adapters are registered to the shared memory region.

22. The computer program product of claim 14, wherein the functional descriptive material enables the computer to perform additional acts including:

reading from the memory access data a first protection domain associated with the shared memory region;

comparing the first protection domain a second protection domain associated with the host channel adapter to determine if the first protection domain and the second protection domain match; and accessing a portion of the shared memory region in response to a determination that the first protection domain and the second protection domain match.

23. The computer program product of claim 22, wherein the functional descriptive material enables the computer to perform additional acts including:

reading from the memory access data an access list associated with the shared memory region; and searching the access list for an instance of an identifier identifying the host channel adapter.

24. The computer program product of claim 23, wherein the accessing the portion of the shared memory region is performed in response to a determination that the first protection domain and the second protection domain match and that the instance of the identifier identifying the host channel adapter is contained within the access list.

25. The computer program product of claim 14, wherein the functional descriptive material enables the computer to perform additional acts including:

reading from the memory access data a physical memory address corresponding to a virtual memory address; and accessing a portion of the shared memory region corresponding to the physical memory address.

26. The computer program product of claim 14, wherein the functional descriptive material enables the computer to perform additional acts including:

returning a key associated with the shared memory region to the host.

27. A data processing system, comprising:

a bus system;

a processing unit connected to the bus system and including at least one processor;

memory connected to the bus system; and a set of instructions in the memory, wherein the processing unit executes the set of instructions to perform acts including:

receiving, from a consumer, an instruction to register a shared memory region in memory of a host, wherein the instruction includes an identification of memory access data associated with the shared memory region; and in response to receiving the instruction, writing an address of the memory access data to a table in memory associated with a host channel adapter.

28. The data processing system of claim 27, wherein the table includes a hardware register.

29. The data processing system of claim 27, wherein the instruction includes at least one of a virtual address for the memory region, a length of the memory region, a protection domain of the memory region, an identifier identifying the host channel adapter, and access control parameters of the memory region.

30. The data processing system of claim 29, wherein the processing unit executes the set of instructions to perform the additional act of:

updating status information denoting which host channel adapters are associated with the shared memory region.

31. The data processing system of claim 30, wherein the updating the status information includes adding to an access list an identifier identifying the host channel adapter.

32. The data processing system of claim 27, wherein the processing unit executes the set of instructions to perform the additional acts of:

receiving an instruction to deregister the host channel adapter from the shared memory region; and invalidating contents of the memory unit.

33. The data processing system of claim 32, wherein the processing unit executes the set of instructions to perform the additional acts of:

removing from an access list an instance of an identifier identifying the host channel adapter.

34. The data processing system of claim 32, wherein the processing unit executes the set of instructions to perform the additional acts of:

determining if additional host channel adapters are registered to the shared memory region; and modifying the memory access data in response to a determination that no additional host channel adapters are registered to the shared memory region.

35. The data processing system of claim 27, wherein the host channel adapter performs acts including:

reading from the memory access data a first protection domain associated with the shared memory region;

comparing the first protection domain a second protection domain associated with the host channel adapter to determine if the first protection domain and the second protection domain match; and accessing a portion of the shared memory region in response to a determination that the first protection domain and the second protection domain match.

36. The data processing system of claim 35, wherein the processing unit executes the set of instructions to perform the additional acts of:

reading from the memory access data an access list associated with the shared memory region; and searching the access list for an instance of an identifier identifying the host channel adapter.

37. The data processing system of claim 36, wherein the accessing the portion of the shared memory region is performed in response to a determination that the first protection domain and the second protection domain match and that the instance of the identifier identifying the host channel adapter is contained within the access list.

38. The data processing system of claim 27, wherein the processing unit executes the set of instructions to perform the additional acts of:

reading from the memory access data a physical memory address corresponding to a virtual memory address; and accessing a portion of the shared memory region corresponding to the physical memory address.

39. The data processing system of claim 27, wherein the processing unit executes the set of instructions to perform the additional acts of:

returning a key associated with the shared memory region to the host.

* * * * *